(12) United States Patent
Potapenko

(10) Patent No.: US 8,441,532 B2
(45) Date of Patent: May 14, 2013

(54) SHAPE MEASUREMENT OF SPECULAR REFLECTIVE SURFACE

(75) Inventor: Sergey Potapenko, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 863 days.

(21) Appl. No.: 12/391,585

(22) Filed: Feb. 24, 2009

(65) Prior Publication Data

US 2010/0214406 A1    Aug. 26, 2010

(51) Int. Cl.
H04N 7/18      (2006.01)

(52) U.S. Cl.
USPC .............. 348/135; 348/36; 348/49; 382/203; 382/181; 345/426

(58) Field of Classification Search .............. 348/135, 348/36, 49; 382/203, 181; 345/426
See application file for complete search history.

(56) References Cited

U.S. PATENT DOCUMENTS

| | | | |
|---|---|---|---|
| 3,338,696 A | 8/1967 | Dockerty | |
| 3,682,609 A | 8/1972 | Dockerty | |
| 7,639,862 B2 * | 12/2009 | Canning et al. | 382/141 |
| 2002/0085757 A1 * | 7/2002 | Yamada et al. | 382/181 |
| 2003/0067612 A1 * | 4/2003 | Ivarsson | 356/600 |
| 2004/0021766 A1 * | 2/2004 | Daniilidis et al. | 348/36 |
| 2004/0032585 A1 * | 2/2004 | Johansen et al. | 356/328 |
| 2004/0104996 A1 * | 6/2004 | Hayashi et al. | 348/36 |
| 2005/0238237 A1 | 10/2005 | Haeusler et al. | 382/203 |
| 2007/0039990 A1 | 2/2007 | Kemmerer et al. | 225/2 |
| 2007/0140311 A1 | 6/2007 | House et al. | 374/100 |
| 2008/0013065 A1 * | 1/2008 | Kohl | 355/67 |
| 2008/0276646 A1 | 11/2008 | Chalk et al. | 65/17.2 |
| 2010/0315422 A1 | 12/2010 | Andre et al. | 345/426 |
| 2011/0181704 A1 * | 7/2011 | Gordon et al. | 348/49 |

FOREIGN PATENT DOCUMENTS

| JP | 11257930 A | 9/1999 |
|---|---|---|
| WO | 2007/018902 | 2/2007 |

OTHER PUBLICATIONS

Knauer, Markus, C., Jurgen Kaminiski, and Gerd Hausler, "Phase measuring deflectometry: a new approach to measure specular free-form surfaces." In Optical Metrology in Production Engineering. *Processings of SPIE* v. 5457 (2004): 366-376.

Kochengin, Sergey A. and Vladimir I. Oilker. "Determination of reflector surfaces from near field scattering data," *Inverse Problems* v. 13 (1997): 363-373.

Savarese, Silvio, Min Chen, and Pietro Perona, "Local shape from mirror reflections," International Journal of Computer Vision, 64(1), 31-67 (2005).

Winkelbach, S. and F. M. Wahl. "Shape from single stripe pattern illumination." Ed. Luc Van Gool. In Pattern Recognition. *Lecture Notes in Computer Science* v. 2449 (Springer, 2002), 240-247.

* cited by examiner

*Primary Examiner* — Thuong Nguyen
(74) *Attorney, Agent, or Firm* — Bruce P. Watson

(57) ABSTRACT

A method of measuring a shape of a specular reflective surface is provided. A pattern displayed on a surface of a target positioned at a target plane is produced from a specular reflective surface positioned at a measurement plane. An image of the reflection is recorded at an imaging plane. Positions of a plurality of points on the specular reflective surface relative to the imaging plane are determined. A first relation between feature positions on the image of the reflection and feature positions on the pattern is determined. The shape of the specular reflective surface is determined from a second relation involving a surface profile of the specular reflective surface and the first relation using the positions of the plurality of points as an initial condition.

18 Claims, 9 Drawing Sheets

SHAPE MEASUREMENT OF SPECULAR REFLECTIVE SURFACE

FIELD

The invention relates generally to optical methods and apparatus for measuring shapes of objects. More specifically, the invention relates to a method and an apparatus for measuring a shape of an object having a specular reflective surface.

BACKGROUND

Fusion draw process is used to make a sheet of material from molten material such as molten glass (Dockerty U.S. Pat. No. 3,338,696 and Dockerty U.S. Pat. No. 3,682,609). Typically, the fusion draw process involves delivering molten material into a trough and overflowing the molten material down the sides of the trough in a controlled manner. The separate streams of material flowing down the sides of the trough merge at the root of the trough into a single stream of material, which is drawn into a continuous sheet of material. The continuous sheet of material is separated into discrete pieces at the bottom of the fusion draw machine. A key advantage of this process is that the surfaces of the sheet of material do not come in contact with the sides of the trough or other forming equipment and therefore are pristine. Another benefit of the process is that the sheet of material is very flat and has a uniform thickness (Dockerty U.S. Pat. No. 3,682, 609).

Large sheets of glass produced by fusion draw process are a key component in making large flat panel displays. Alternatively, they can be diced to make other devices such as active electronic devices, photovoltaic devices, and biological arrays. However, as the demand for larger large-sized sheet increases, so does the difficulty in forming and handling of these sheets. For example, sheet scoring and separation processes at the bottom of the fusion draw machine contribute significantly to the sheet motion in the forming zone of the fusion draw machine. Sheet motion in the forming zone can negatively impact the level of stress and stress variation within the sheet, possibly leading to distortion in the final product. The larger the sheet being handled, the more significant the effect of sheet motion can be on the stress level and variation with the sheet.

Corning Incorporated, the assignee of the present invention, has developed various techniques for minimizing sheet motion at the bottom of the draw. One such technique involves scoring the glass sheet by laser, thereby avoiding physical contact with the glass sheet that can result in sheet motion (Abramov et al. U.S. patent application Ser. No. 12/008,949). Another technique involves use of a conformable nosing device to engage a glass sheet while the glass sheet is being scored, thereby reducing motion of the glass sheet during scoring (Chalk et al. U.S. Patent Publication 2008/0276646). Another technique involves separation of the glass sheet without bending the glass sheet (Kemmerer et al. U.S. Patent Publication US 2007/0039990). These techniques require real-time information about the displacement and shape of the glass sheet. Such information at different elevations of the FDM may also be useful in fine-tuning and optimizing the draw process.

Smooth glass sheets have surfaces that behave as specular reflective surfaces for visible light. Shape measurement of specular reflective surfaces by optical means is fundamentally different from shape measurement of diffuse reflective surfaces by optical means. A diffuse reflective surface can be considered as a collection of secondary point light sources. Thus, the shape of a diffuse reflective surface may be estimated by locating the position of these sources. A specular reflective surface, on the other hand, cannot be observed directly. Only reflection from the specular reflective surface is visible. The problem of measuring the shape of a specular reflective surface has been studied in, for example, Savarese et al., "Local shape from mirror reflections," International Journal of Computer Vision, 64(1), 31-67 (2005); Haeusler, et al U.S. Patent Publication 2005/0238237; Knauer et al., "Phase measuring deflectometry: a new approach to measure specular free-form surfaces." In Optical Metrology in Production Engineering. *Proceedings of SPIE* v. 5457 (2004): 366-376.; Kochengin et al, "Determination of reflector surfaces from near field scattering data." *Inverse Problems* v. 13 (1997): 363-373, and Winkelbach, et al "Shape from single stripe pattern illumination." Ed. Luc Van Gool. In Pattern Recognition. *Lecture Notes in Computer Science* v. 2449 (Springer, 2002), 240-247. These references did not study the problem of measuring the shape of a large-sized glass sheet, such as useful in the flat panel display industry.

Techniques for measuring shapes of specular reflective surfaces have the same difficulty to overcome: slope-position uncertainty. The slope-position uncertainty problem can be illustrated with reference to FIG. 1 (Haeusler et al. U.S. Patent Publication 2005/0238237). In FIG. 1, a camera $K_1$ captures a reflection of a pattern 2 via a specular surface 3. Line 5*a* represents a beam coming from point 7 on a screen 1, where pattern 2 is produced, and incident on point 6 on the specular surface 3. Line 5*b* represents a beam reflected from point 6 on the specular surface 3 and incident on point 9 in the image plane 8 of the camera $K_1$. The positions of screen 1 and camera $K_1$ are known. The positions of point 7 and point 9 are also known. However, this information is not sufficient to allow the position of point 6, having surface normal 11, to be determined with certainty for two reasons: (i) the specular surface 3 is invisible and (ii) other points along the line of sight 5*b*, e.g., point 6*a* having suitable surface normal 11*a*, would also image point 7 to point 9. Without knowing the position of reflection points on the specular surface, it is not possible to uniquely determine the shape of the specular surface.

Haeusler et al. U.S. Patent Publication 2005/0238237 and Knauer et al. "Phase measuring deflectometry: a new approach to measure specular free-form surfaces." In Optical Metrology in Production Engineering. *Proceedings of SPIE* v. 5457 (2004): 366-376, use stereo-deflectometry to resolve ambiguities in position of the reflection point. The method generally involves capturing multiple reflected images of a sinusoidal pattern from different lines of sight and looking for points in the measuring space at which potential surface normals have the least deviation from one another. Kochengin, et al "Determination of reflector surfaces from near field scattering data." *Inverse Problems* v. 13 (1997): 363-373, takes a different approach including measuring the shape of the reflecting surface R from near-field scattering data measured on an object T. The setup is such that rays reflected off the reflecting surface R are incident on the object T. The position of object T is known, Kochengin, et al. "Determination of reflector surfaces from near field scattering data." *Inverse Problems* v. 13 (1997): 363-373 and shows that if the position and intensity of source O are also known, the reflector can be determined by solving an inverse problem. Savarese et al., "Local shape from mirror reflections," International Journal of Computer Vision, 64(1), 31-67 (2005) propose schemes for measuring local geometric information of a mirror surface around a reflection point r by analyzing the deformation produced upon a planar pattern of intersecting lines through specular reflection on the mirror surface at the point r.

SUMMARY

Technical Problem

A practical method and apparatus for unambiguously measuring shapes of specular reflective surfaces, particularly large-sized glass sheets, under online or offline conditions is desired.

Solution to Technical Problem

In a first aspect, a method of measuring a shape of a specular reflective surface is provided. The method comprises producing a reflection of a pattern displayed on a surface of a target positioned at a target plane from a specular reflective surface positioned at a measurement plane. The method includes recording an image of the reflection at an imaging plane. The method further includes determining positions of a plurality of points on the specular reflective surface relative to the imaging plane. The method includes determining a first relation between feature positions on the image of the reflection and feature positions on the pattern. The method also includes determining the shape of the specular reflective surface from a second relation involving a surface profile of the specular reflective surface and the first relation using the positions of the plurality of points as an initial condition.

In a first variation of the first aspect, producing the reflection comprises illuminating the pattern.

In a first sub-variation of the first variation, producing the reflection comprises illuminating the pattern by continuous light.

In a second sub-variation of the first variation, producing the reflection comprises illuminating the pattern by flash light.

In a second variation of the first aspect, producing the reflection comprises selecting a planar geometric pattern, e.g., checkerboard, stripes, dots, circles, or crosses, as the pattern displayed on the surface of the target.

In a third variation of the first aspect, the method further comprises focusing the image of the reflection on the target plane.

In a sub-variation of the immediate above, focusing the image of the reflection on the target plane comprises using a lens to focus the imaging plane on a reflection of the target plane into the measurement plane.

In a fourth variation of the first aspect, determining positions of the plurality of points on the specular reflective surface comprises measuring the positions of the points relative to the measurement plane.

In a sub-variation of the immediate above, determining positions of the plurality of points on the specular reflective surface further comprises selecting the plurality of points along a line at or near an edge of the specular reflective surface. In one variation, the line is located at or near the edge of the specular reflective surface that is closest to the imaging plane.

In a sub-variation of the immediate above, measuring the positions of the points comprises measuring the position of the points with a linear array of displacement sensors disposed adjacent to the specular reflective surface.

In a sub-variation of the immediate above, measuring the positions of the points comprises measuring without changing relative positions of the target plane, the measurement plane, and the imaging plane.

In a fifth variation of the first aspect, determining positions of the plurality of points on the specular reflective surface relative to the imaging plane comprises selecting the plurality of points on the measurement plane and extracting positions of the plurality of points from a known position of the measurement plane relative to the imaging plane.

In a sixth variation of the first aspect, the second relation in one dimension has the form:

$$\frac{dz}{dx} = \frac{ux - t(u) + z}{\sqrt{1+u^2}\sqrt{(t(u)-z)^2 + x^2} + x + u(t(u)-z)};$$

wherein z is the surface profile in a direction perpendicular to the measurement plane, dz/dx is the derivative of the surface profile, x is a direction parallel to the measurement plane, $\alpha = \text{ArcTan}(u)$ is the angle between a vector in the direction of the reflected light and the measurement plane, t(u) is the first relation, and $$u = \frac{z_p - z}{x_p - x};$$

wherein $(x_p, z_p)$ is a location of a center of projection of the reflection onto the imaging plane.

In a seventh variation of the first aspect, the second relation has the form:

$$I(t) = \frac{R - t - 2N(N \cdot (R-t))}{\sqrt{(R-t) \cdot (R-t)}}$$

wherein I(t) is the first relation, R is a point on the specular reflection surface, and N is a normal vector to the specular reflection surface;
wherein:

$$N = \frac{\left\{-\frac{\partial z}{\partial x}, -\frac{\partial z}{\partial y}, 1\right\}}{\sqrt{1 + \left(\frac{\partial z}{\partial x}\right)^2 + \left(\frac{\partial z}{\partial y}\right)^2}};$$

wherein z(x,y) is the surface profile and $$\frac{\partial z}{\partial x} \text{ and } \frac{\partial z}{\partial y}$$

are the partial derivatives of the surface profile.

In an eighth variation of the first aspect, determining the first relation comprises identifying a plurality of sub-areas on the image of the reflection and a plurality of corresponding sub-areas on the pattern and determining a first sub-relation between feature positions on each of the sub-areas on the image of the reflection and feature positions on each of the corresponding sub-areas on the pattern.

In a sub-variation of the immediate above, determining the shape of the specular reflective surface from the second relation comprises determining the shapes of sub-areas of the specular reflective surface from the second relation and the first sub-relations using the positions of the plurality of points as an initial condition.

In a sub-variation of the immediate above, the method further comprises combining the shapes of the sub-areas of the specular reflective surface to obtain the shape of the specular reflective surface.

In a second aspect, an apparatus for measuring a shape of a specular reflective surface is provided. The apparatus includes a target having a surface on which a pattern is displayed and a camera having a recording media for recording an image of a reflection of the pattern from the specular reflective surface. The apparatus includes a data analyzer configured to determine the shape of the specular reflective surface from a first relation between feature positions on the image of the reflection and feature positions on the pattern and a second relation involving a surface profile of the specular reflective surface and the first relation.

In a first variation of the second aspect, the apparatus further includes a linear array of displacement sensors for measuring positions of a plurality of points on the specular reflective surface relative to a reference plane.

In a second variation of the second aspect, the data analyzer is further configured to receive as input an initial condition comprising measured or known positions of a plurality of points on the specular reflective surface relative to a reference plane and to use the initial condition in determining the shape of the specular reflective surface.

In a third variation of the second aspect, the data analyzer is configured to resolve the second relation having in one dimension the form:

$$\frac{dz}{dx} = \frac{ux - t(u) + z}{\sqrt{1+u^2}\sqrt{(t(u)-z)^2 + x^2} + x + u(t(u)-z)};$$

wherein z is the surface profile in a direction perpendicular to the measurement plane, dz/dx is the derivative of the surface profile, x is a direction parallel to the measurement plane, $\alpha = \text{ArcTan}(u)$ is the angle between a vector in the direction of the reflected light and the measurement plane, t(u) is the first relation, and $$u = \frac{z_p - z}{x_p - x};$$

wherein $(x_p, z_p)$ is a location of a center of projection of the reflection onto the recording media.

In a fourth variation of the second aspect, the data analyzer is configured to resolve the second relation having the form:

$$I(t) = \frac{R - t - 2N(N \cdot (R-t))}{\sqrt{(R-t)\cdot(R-t)}};$$

wherein I(t) is the first relation, R is a point on the specular reflection surface, and N is a normal vector to the specular reflection surface;
wherein:

$$N = \frac{\left\{-\frac{\partial z}{\partial x}, -\frac{\partial z}{\partial y}, 1\right\}}{\sqrt{1+\left(\frac{\partial z}{\partial x}\right)^2 + \left(\frac{\partial z}{\partial y}\right)^2}};$$

wherein z(x,y) is the surface profile and $$\frac{\partial z}{\partial x} \text{ and } \frac{\partial z}{\partial y}$$

are the partial derivatives of the surface profile.

In a fifth variation of the second aspect of the invention, the apparatus further comprises a light source for illuminating the surface of the target.

Other features of the invention will be apparent from the description of embodiments and the claims.

Advantageous Effects

The invention in one or more aspects, and variations thereof may provide one or more of the following advantages.

First, the invention unambiguously resolves the slope-position uncertainty problem associated with measuring the shape of a specular reflective surface.

Second, the invention can be used to recover the shape of a sheet having specular reflective surfaces in any orientation of the sheet.

Third, shape measurement of a specular reflective surface using the invention is robust and practical. The shape of the specular reflective surface can be determined from a single reflection image and positions of points on the specular reflective surface relative to an imaging plane. The positional data may be known, for example, if the points are selected on a line at or near the edge of the specular reflective surface and the distance between the edge and the imaging plane is known or can be determined. Alternatively, the positional data can be obtained with a linear array of displacement sensors, which would make the system less expensive compared to surface measurements based on two-dimensional array of displacement sensors.

Fourth, shape measurement of a specular reflective surface using the invention is as fast as the reflection image and the sensor data acquisition time. This time can be in a range of tens of milliseconds with a continuous light source or even tens of microseconds with a flash light to display the pattern on the target.

Fifth, the invention allows grazing viewing angles to be used to increase the sensitivity to surface waviness with the wave vectors along the viewing direction. Grazing viewing angles can be used because the displacement sensors, which provide initial condition, maintain the sensitivity for the perpendicular waviness.

Sixth, the invention allows grazing viewing angles to be used to make the apparatus compact. Compactness becomes more important for larger sheet sizes.

Other advantages of the invention will be apparent from the description of embodiments and claims.

DESCRIPTION OF EMBODIMENTS

Figure 1:
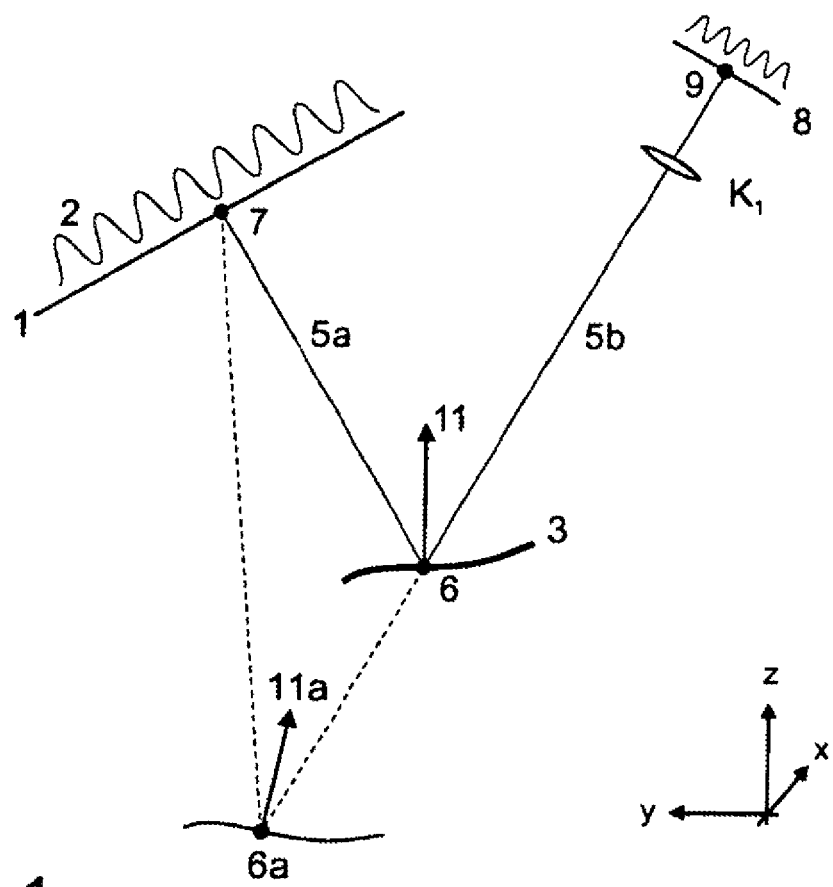
FIG. 1 is a diagrammatic illustration for explaining the slope-position uncertainty.
Figure 2:
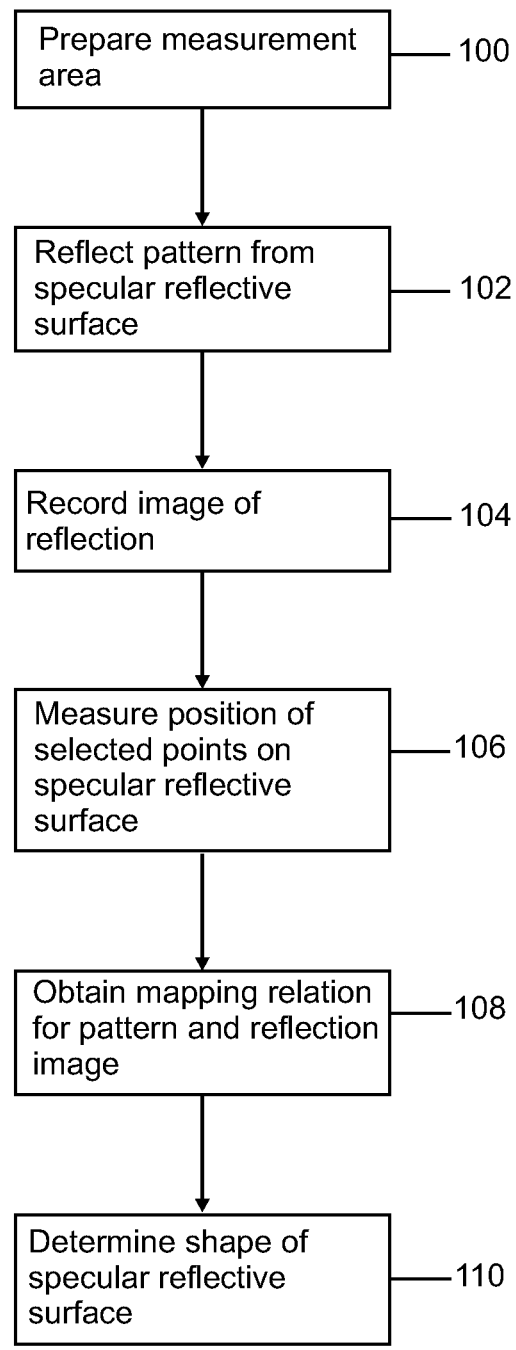
FIG. 2 is a flowchart illustrating a method of measuring a shape of a specular reflective surface.

FIG. 2 is an overview of a method of measuring a shape of a specular reflective surface. The measurement area is prepared (100). This includes positioning a specular reflective surface at a measurement plane, positioning a target at a target plane, and positioning a recording media at an imaging plane. A pattern on the target is reflected from the specular reflective surface (102). The recording media records an image of the reflection (reflection image) (104). Points are selected on the specular reflective surface and positions of the points relative to the measurement plane are measured (106). The reflection image obtained in 104 and the pattern are analyzed to obtain a mapping relation that relates feature positions on the reflection image to feature positions on the pattern (108). The shape of the specular reflective surface is determined by solving a geometric relation that relates the shape of the specular reflective surface to the mapping relation (110). The shape of the specular reflective surface is determined such that the geometric relation is true for the points whose positions were measured in 106. In 108, a plurality of sub-areas may be identified on the reflection image and a plurality of corresponding sub-areas may be identified on the pattern. Then, the mapping relation may be determined for each corresponding sub-areas of the reflection image and pattern. As an example, three sub-areas RM1, RM2, and RM3 may be identified on the reflection image, and three corresponding sub-areas PM1, PM2, and PM3 may be identified on the pattern. A total of three mapping relations would be determined for the following combinations of sub-areas: RM1 and PM1; RM2 and PM2; and RM3 and PM3. In 110, the shape of each sub-area of the specular reflective surface may be determined using the geometric relation, the mapping relation associated with each sub-area (as determined in 108), and the initial condition obtained in 106. The shapes of the sub-areas may be combined to obtain the shape or full surface profile of the specular reflective surface.

Figure 3A:
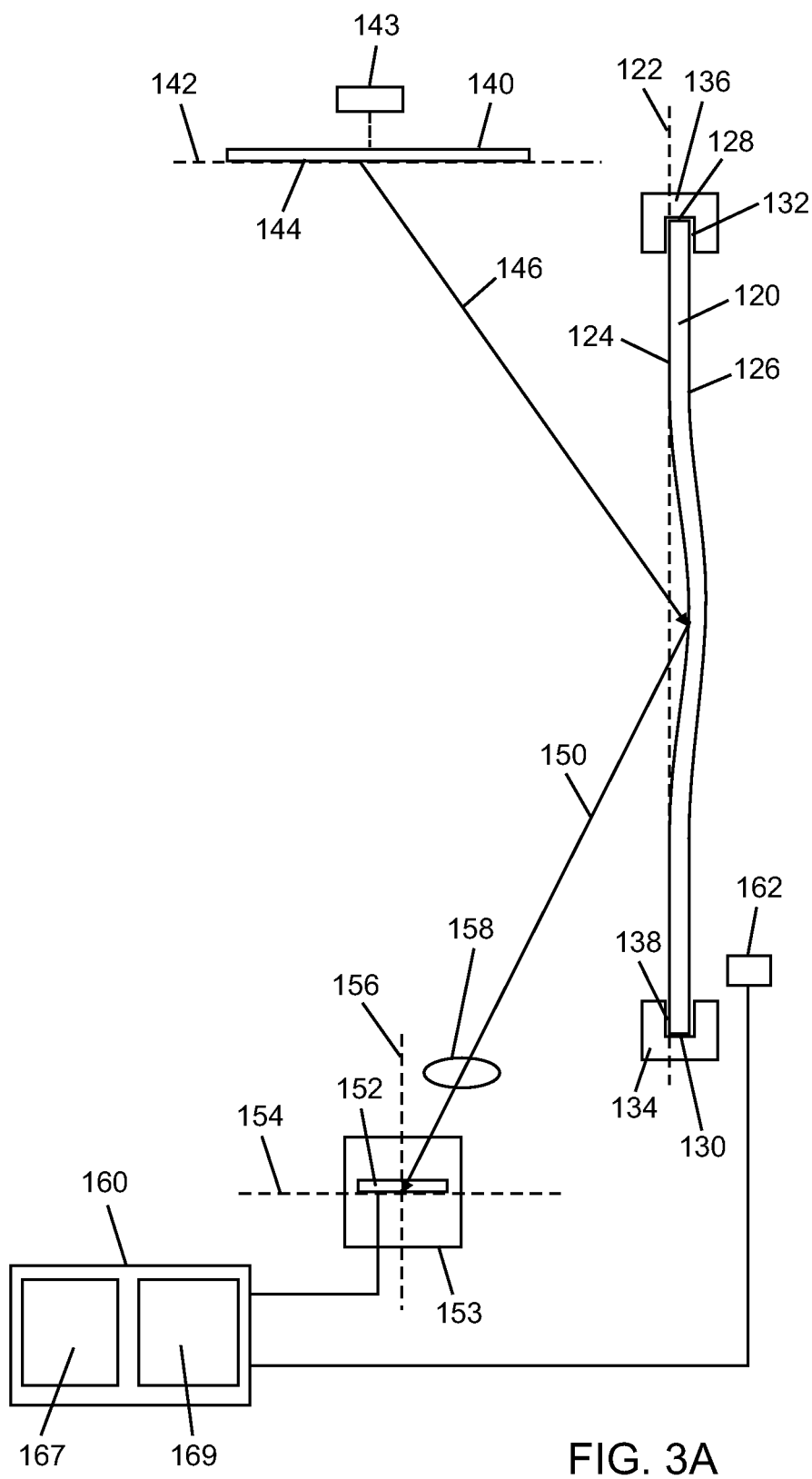
FIG. 3A is a measurement setup for carrying out the method illustrated in FIG. 2.
Figure 3B:
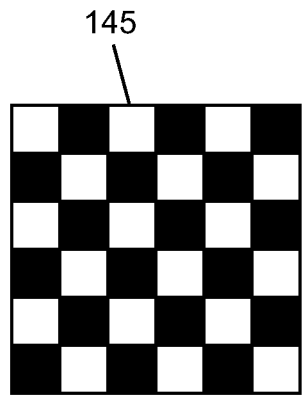
FIG. 3B is a diagram of a checkerboard pattern.
Figure 3C:
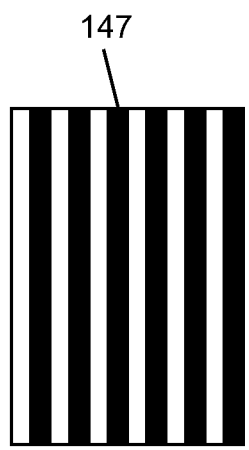
FIG. 3C is a diagram of a striped pattern.

FIG. 3A is an illustration of a measurement area prepared as indicated at 100 of FIG. 2. In FIG. 3A, a sheet of material 120, whose shape is to be measured, is positioned at a measurement plane 122. The measurement plane 122 is an imaginary plane that is coincident with the ideal plane of the sheet of material 120. The ideal plane of the sheet of material 120 is the plane of the sheet of material assuming that the sheet of material is perfectly flat. The sheet of material 120 has specular reflective surfaces 124, 126. The specular reflective surface to be measured is indicated at 124. In one example, the sheet of material 120 is a sheet of glass-based material having smooth surfaces that behave as specular reflective surfaces. The sheet of material 120 may be arranged in any suitable manner, e.g., vertical, horizontal, or inclined position. For example, the sheet of material 120 may be supported on a horizontal table surface, supported on an inclined surface, supported at the bottom or top edge, or hung by the top edge. In the example illustrated in FIG. 3, the sheet of material 120 is hung in a vertical position, with opposing vertical edges 128, 130 disposed in grooves 132, 134 in fixtures 136, 138, respectively. In a fusion draw process, the fixtures 136, 138 may be sets of paired rollers arranged to guide the sheet of glass 120 along the fusion draw machine. As previously mentioned, alternative arrangements may include placing the sheet of material 120 on a horizontal or inclined surface.

FIG. 3A shows a target 140 having a surface 144 positioned at a target plane 142. The surface 144 of the target 140 includes a pattern displayed thereon that will be reflected off the specular reflective surface 124 of the sheet of material 120. In one example, the pattern on the surface 144 includes planar features. In one example, the planar features include geometric shapes, such as a checkerboard pattern 145 shown in FIG. 3B or a striped pattern 147 shown in FIG. 3C. Other examples of geometric shapes include, but are not limited to, circles, dots, and crosses. In general, any pattern features that can be assigned location coordinates and used in determining feature locations in an image analysis may be used. In alternate examples, the pattern may be continuous fringes, e.g., sinusoidal fringes. Referring to FIG. 3A, the pattern may be displayed on the surface 144 of the target 140 using any suitable method. For example, the target 140 may be made of an opaque material and the surface 144 may be illuminated from the front to form the pattern, or the target 140 may be made out of translucent material and the surface 144 may be illuminated from the back to form the pattern. The pattern also may be a computer-generated pattern displayed on a screen, e.g. by an LCD monitor, or projected on a screen. The illumination light source (identified for illustration purposes as 143) may be a continuous light or a flash light. In the latter case, the measurement can be done while the sheet 120 is moving, e.g. for online measurements. Light travels from the target surface 144 to the specular reflective surface 124 of the sheet of material 120 as indicated by line 146 and is reflected from the specular reflective surface 124 along the line 150. If the sheet 120 is transparent, part of the light will pass through the sheet 120. Part of the light passed through the sheet 120 will be reflected by back surface 126. In this case, the sheet 120 should be thin enough so the light reflected from two (or more) surfaces will not deviate from each other to the extent that the analysis of the reflection image is impossible FIG. 3A shows a recording media 152 of a camera 153 positioned at an imaging plane 154 to record a reflection from the specular reflective surface 124. Any suitable camera 153, such as a CCD camera or video camera with sufficient pixel resolution to achieve the desired accuracy, may be used. The recording media 152 may include one or more imaging sensors. The imaging plane 154 is substantially perpendicular (e.g., 90°±5°) to the measurement plane 122. In some examples, the target plane 142 is substantially perpendicular (e.g., 90°±5°) to the measurement plane 122. In this position, the optical axis 156 of the recording media 152 is substantially perpendicular (e.g., 90°±5°) to the target plane 142. A lens 158, e.g., a shift lens, is used to focus the image of the reflection produced by the specular reflective surface 124 onto the imaging plane 154. In other examples, the target plane 142 is not perpendicular or substantially perpendicular to the measurement plane 122, and the lens 158 is used shifted and titled as necessary to focus the imaging plane 154 on the reflection of the target plane 142 into the measurement plane 124.

As explained with reference to FIG. 2, the pattern on the target surface 144 is reflected off the specular reflective surface 124 and recorded by the recording media 152. A data analyzer 167 includes machine-readable instructions that receives the reflection image and pattern as input and analyzes the reflection image and pattern to obtain a mapping relation between the pattern and reflection image. The data analyzer 167 may receive a representation or image of the pattern. The instructions of the data analyzer 167 may be executed on a general-purpose CPU 160 having appropriate hardware. A data analyzer 169 includes machine-readable instructions that receives the mapping relation as input and determines the shape of the specular reflective surface 124 using the mapping relation and a geometric relation, as will be explained below. The data analyzer 169 also receives positional data from a displacement sensor array 162 as input. The positional data is used as initial condition when resolving the geometric relation. If the position of the sheet 120 along a line preferably closest to the camera is known, e.g. the sheet edge is arranged with respect to a fixture 138 whose position is determined during the measurement setup and does not change, the displacement sensors are not needed. In this case the data analyzer 169 will use the data on the fixture location. The instructions of the data analyzer 169 may be executed on the CPU 160 or on a separate CPU (not shown). Execution of the instructions of the analyzers 167, 169 may be achieved through the use of one or more program storage devices readable by the CPU(s) 160 and encoding one or more programs of instructions executable by the computer for performing the operations described herein. The program storage device may take the form of, for example, one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. The data analyzers 167, 169 may be sub-components of a single data analyzer or may be separate data analyzers.

Figure 3D:
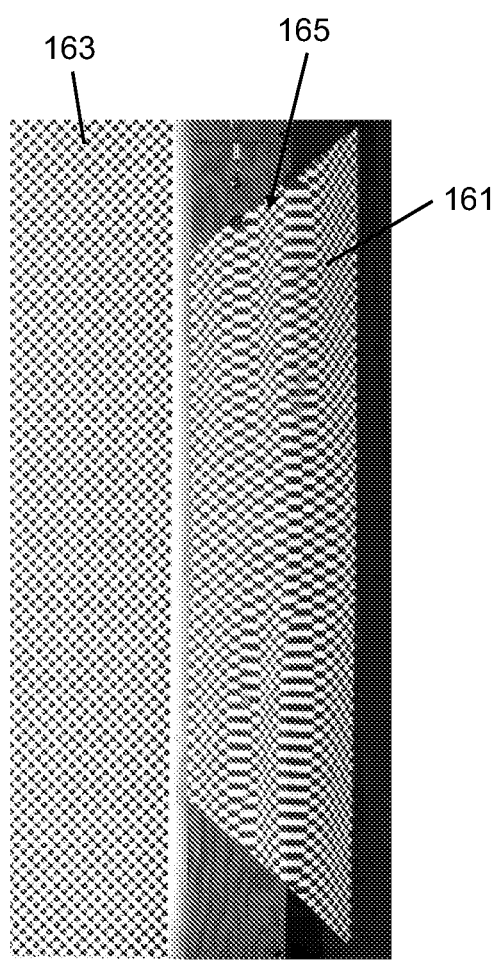
FIG. 3D shows a reflection image of a checkerboard pattern produced from a specular reflective surface.

FIG. 3D shows an example of a reflection image 161 acquired through reflection of a checkerboard pattern 163 off a specular glass surface 165. The reflection image 161 is distorted in comparison to the checkerboard pattern 163 by the shape of the glass 165. The data analyzer (161 in FIG. 3A) may contain a procedure for determining the mapping relation between features in the pattern 163 and features in the reflection image 161. Mapping involves marking features in the pattern 163 and identifying the position of the marked features in the reflection image 161. In the checkerboard pattern 163, a feature may be a grid point or a line. The positions of the features in the pattern and the corresponding features in the reflection image in a global coordinate system can be determined if (i) the locations of the target surface (144 in FIG. 3A) and the recording media (152 in FIG. 3A) in the global coordinate system are known and (ii) the feature locations with respect to the target and the image of the feature with respect to the recording media are known. The locations of the features in the target pattern are determined from the image analysis. The locations of other components (target, measurement plane, lens, imaging plane and displacement sensors) may be obtained by direct measurement or by analyzing location of known objects in the image other than target reflection features, e.g. fiducials on the target and in the measurement plane.

Figure 4:
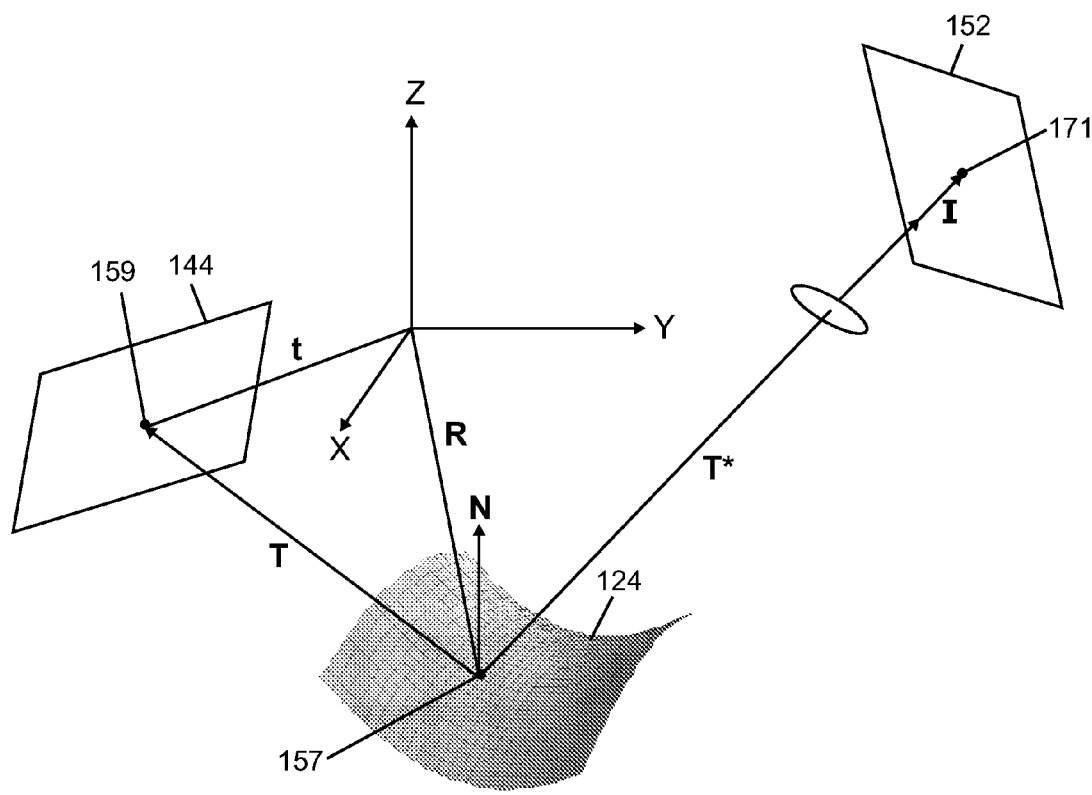
FIG. 4 is a geometric representation of a shape recovery method in three-dimensional space.

FIG. 4 shows the specular reflective surface 124, the target surface 144, and the recording media 152 relative to a spatial coordinate system XYZ. R is the position vector of a point 157 on the specular reflective surface 124. N is a normal vector to the specular reflective surface 124 at point R. T is a vector from the surface point 157 on the specular reflective surface 124 to a point 159 on the target surface 144. T* is a vector in the direction of the reflected light, from the surface point 157 to a point 171 on the recording media 152. Vector T* has the following expression:

$$T^* = -T + 2N(N \cdot T) \qquad (1)$$

I is the unit vector in the direction of the reflected light and is given by:

$$I = \frac{T^*}{|T^*|} \qquad (2)$$

From equations (1) and (2), the relationship between the normal vector N and the unit vector I is given by:

$$I = \frac{-T + 2N(N \cdot T)}{|T|} \qquad (3)$$

If t=T−R is the position vector of point 159 on the target surface 144, then equation (3) can be written in terms of position vector t as follows:

$$I(t) = \frac{R - t - 2N(N \cdot (R - t))}{\sqrt{(R-t) \cdot (R-t)}} \qquad (4)$$

where $$N = \frac{\left\{-\frac{\partial z}{\partial x}, -\frac{\partial z}{\partial y}, 1\right\}}{\sqrt{1 + \left(\frac{\partial z}{\partial x}\right)^2 + \left(\frac{\partial z}{\partial y}\right)^2}} \qquad (5)$$

In equation (4), I(t) represents the mapping relation between the pattern and the image of the reflection (reflection image) of the pattern. In equation (5), z(x/y) is the surface profile and $$\frac{\partial z}{\partial x} \text{ and } \frac{\partial z}{\partial y}$$

are the partial derivatives of the surface profile. From equations (4) and (5), if I(t) is known and R={x,y,z(x,y)}, the surface profile z(x,y) can be determined.

Using I(u(t))={Cos α, 0,Sin α}, u=Tan α, the surface profile for the one-dimensional case is given by:

$$\frac{dz}{dx} = \frac{ux - t(u) + z}{\sqrt{1 + u^2} \sqrt{(t(u) - z)^2 + x^2} + x + u(t(u) - z)} \qquad (6)$$

In equation (6), t(u) is the function known from the image analysis, where u should be substituted with $$u = \frac{z_p - z}{x_p - x}. \qquad (7)$$

Figure 5:
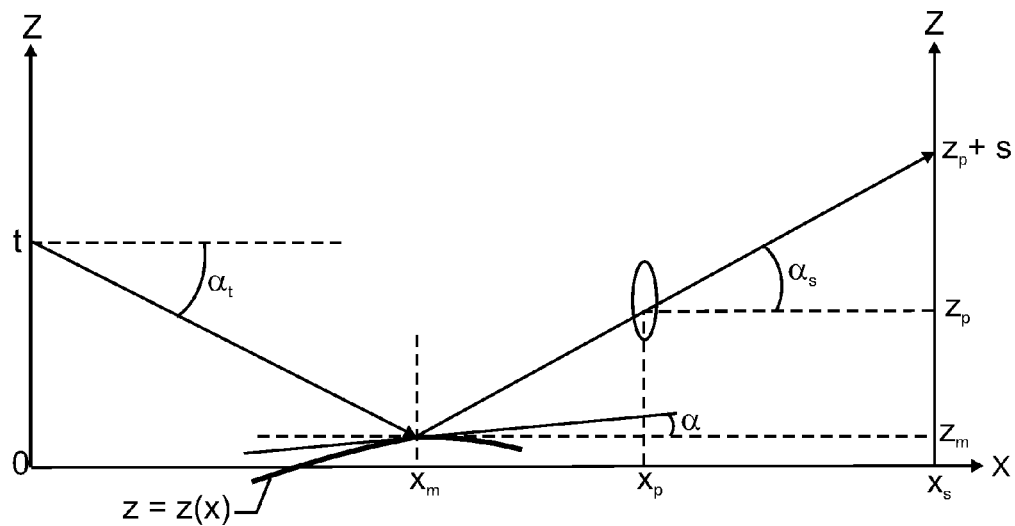
FIG. 5 is a geometric representation of a shape recovery method in one-dimension.

In equation (6), z(x) is the surface profile along one dimension, dz/dx is the derivative of the surface profile, x is a direction parallel to the measurement plane, α=ArcTan(u) is the angle between the vector in the direction of the reflected light and the measurement plane, and t(u) is the mapping relation between the pattern and an image of the pattern captured from the specular reflective surface. Equation (6), being exact in one dimensional case, is also applicable as an approximation in two dimensional cases for small viewing angles α, e.g., less than 30°. FIG. 5 is a geometrical representation of the shape recovery for the one-dimensional case. In FIG. 5, the target is placed at x=0, the projective point is at $\{x_p, z_p\}$, and the recording media is at $x=x_s$. The lens is shifted along z with respect to the center of the recording media and focused on the target plane. Angle α is the angle between the tangent to the surface at $x=x_m$ and the horizontal axis, $α_t$ is the angle of the incident ray from point t, and $α_s$ is the angle of the reflected ray.

Figures 6, 7A:
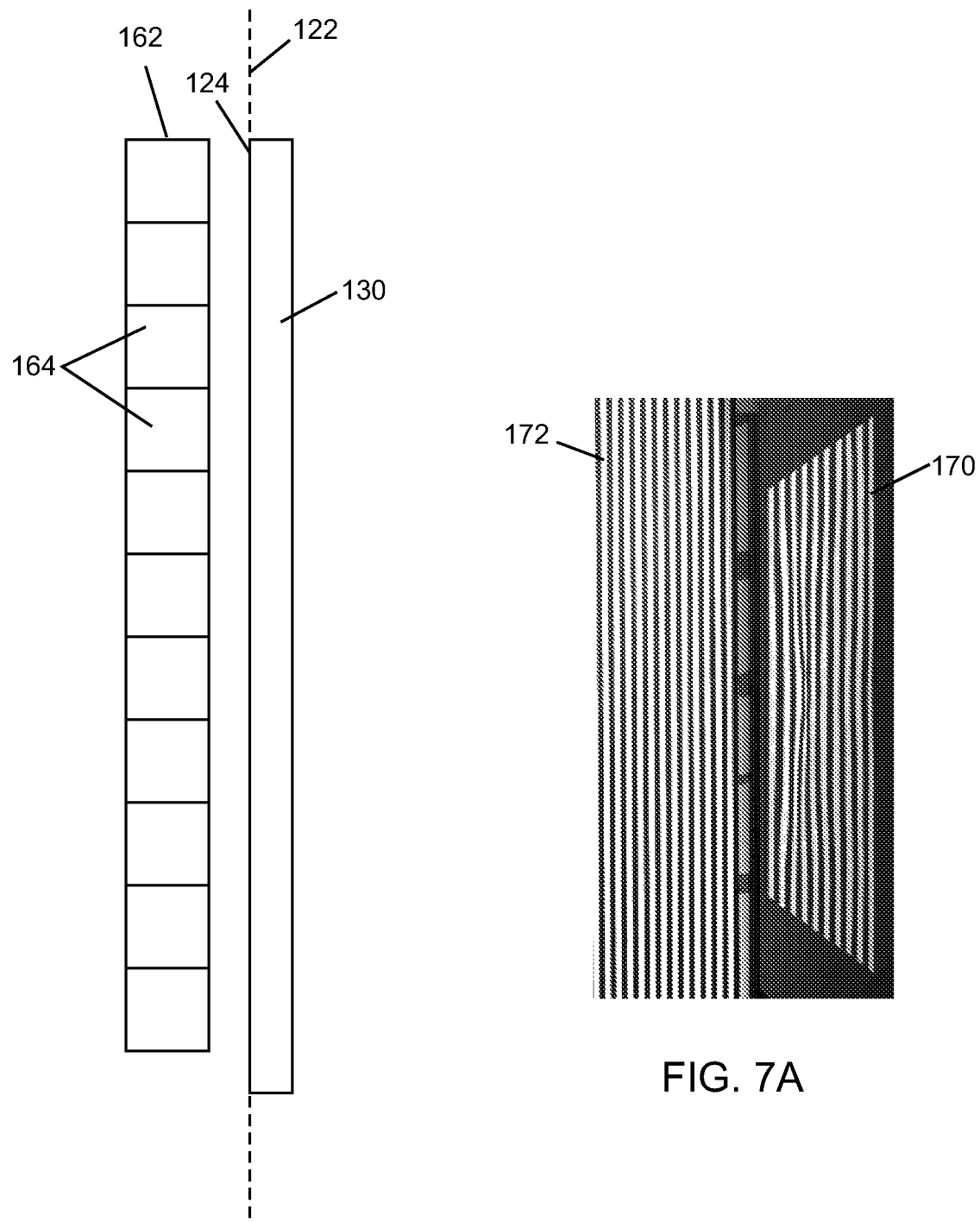
FIG. 6 is a setup for measuring a shape profile at the edge of a specular reflective surface.
FIG. 7A shows a reflection of a striped pattern produced from a specular reflective surface.

For the integration of the differential equation shown in equation (6), an initial condition is needed. The initial condition may be a shape profile measured on the specular reflective surface (124 in FIG. 3A). In the method described in FIG. 2, this initial condition is obtained at 106. In one example, the shape profile at an edge of the specular reflective surface (124 in FIG. 3A), e.g., edge 130 in FIG. 2, is used as the initial condition. Referring to FIG. 6, the shape profile at the edge of the specular reflective surface 124 relative to the measurement plane 122 may be obtained using a linear array 162 of displacement sensors 164 arranged along the edge 130 of the specular reflective surface 124. A single displacement sensor 164 may also be used to obtain the shape profile, but this would require translating the single displacement sensor 164 along the edge of the specular reflective surface 124. If the position of the edge of the specular reflective surface 124 relative to the measurement plane is known, the position of the edge of the specular reflective surface 124 relative to the imaging plane can be determined. Positions of the measurement plane 122, recording media (152 in FIG. 3A), and the lens 158 can be obtained by direct measurements. A reference sheet may also be used to find the position of the edge of the specular reflective surface 124 relative to the imaging plane.

EXAMPLES

The examples below demonstrate the validity of the method described above in measuring shapes of specular reflective surfaces.

Example 1

Figure 7B:
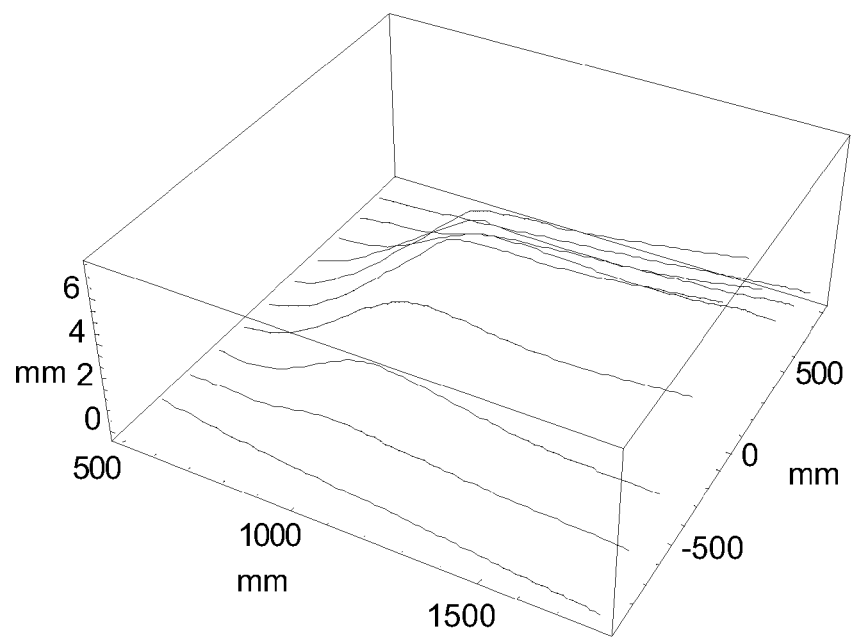
FIG. 7B is a plot of a shape of a glass sheet measured using the method outlined in FIG. 2.
Figure 7C:
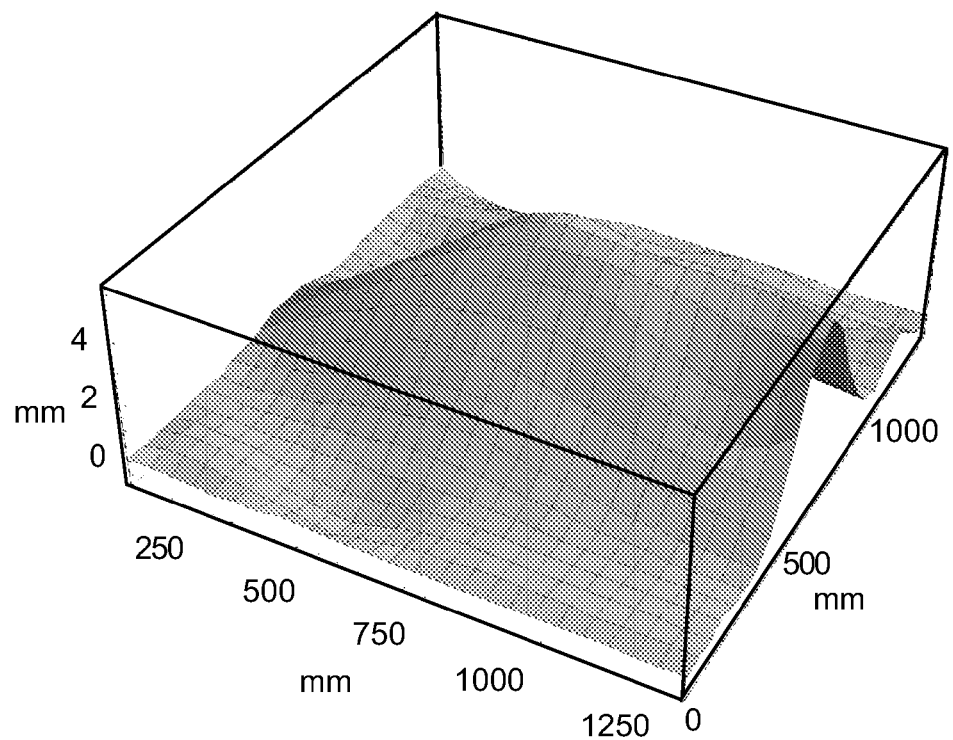
FIG. 7C is a plot of a shape of a glass sheet measured by scanning the glass sheet with a displacement sensor.

FIG. 7B shows shape measurement of a glass sheet on a horizontal platform using the method described above with reference to FIGS. 2-6. The shape of the glass sheet was induced by placing a plate under the glass. The glass edge facing the target was touching the table, which was used as the initial condition for the differential condition. The target had a striped pattern. FIG. 7A shows the reflection image 170 acquired from the striped pattern 172. The reflection image 170 was used in obtaining the mapping relation, as described above. For comparison purposes, the profile of the glass was also measured by an optical displacement sensor mounted on the a rail. The result is shown in FIG. 7C. As can be observed visually, there is agreement between the profiles shown in FIGS. 7B and 7C.

Example 2

Figure 8:
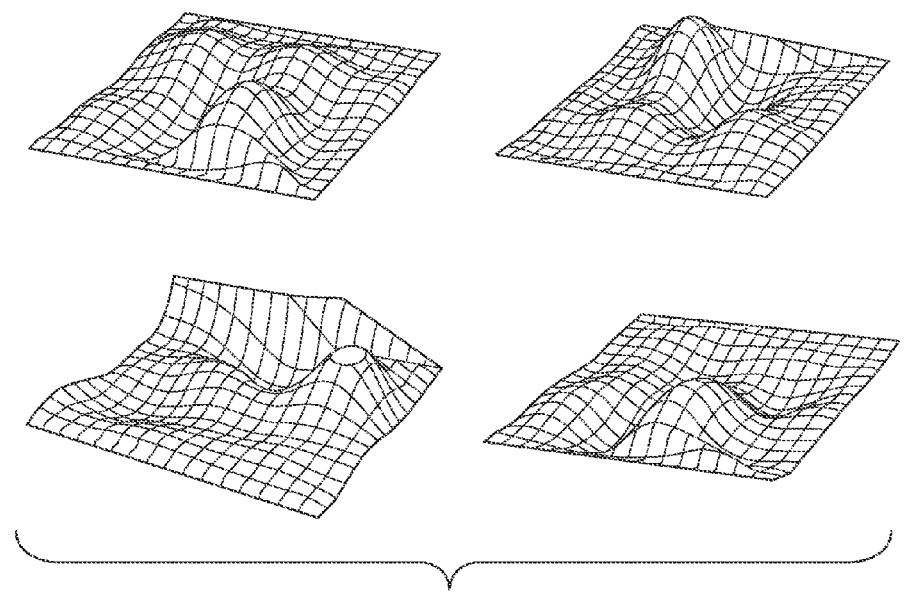
FIGS. 8 and 9 are shapes of glass sheets measured using the method outlined in FIG. 2.
Figure 9:
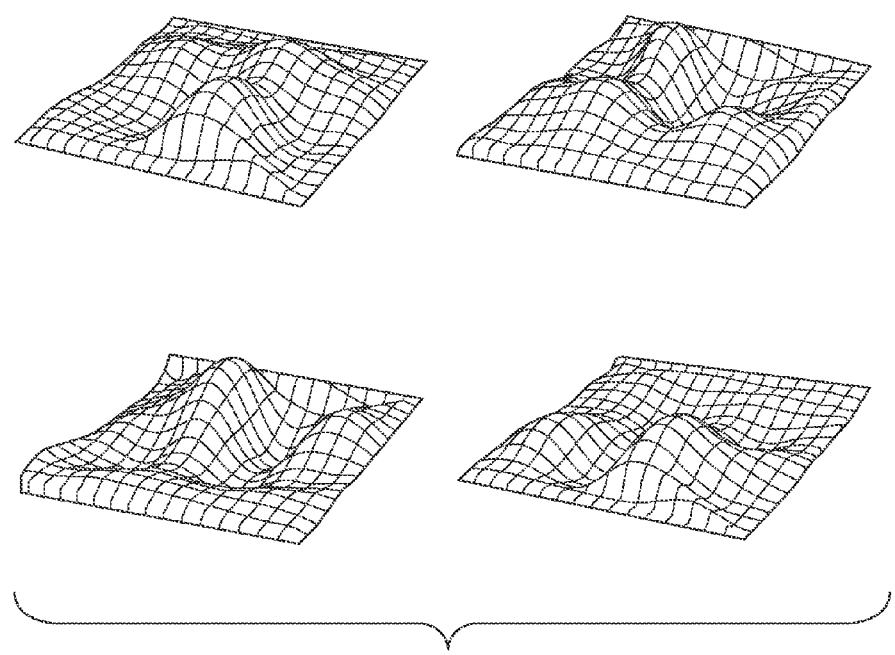

FIGS. 8 and 9 show shapes of two different glass sheets recovered by the method described above at different orientations of the glass sheets on the measurement table. An array of displacement sensors along the right edge of the glass was used to obtain the initial condition for the integration of the differential equation. Four measurements of the same glass sheet at different orientations are shown in FIG. 8. Similarly, four measurements of the same glass sheet at different orientations are shown in FIG. 9. FIGS. 8 and 9 show that the method described above is not dependent on the orientation of the glass sheet.

In the description of FIG. 2 above, it was mentioned that at 108, the reflection image may be sub-divided into sub-areas and the mapping relation may be determined for each sub-area. There are two ways of interpreting this process. A single large reflection image may be captured with a single camera and then sub-divided into sub-areas. With a single camera the target size needs to be larger than the portion of the specular reflective surface whose shape is to be recovered in at least one dimension. An alternative is to use multiple cameras to generate multiple reflection images, where each reflection image captured by each camera corresponds to a sub-area of the specular reflective surface. With multiple cameras, the target size does not need to be larger than the measurement area of the specular reflective surface. As an example, two cameras may be used. The cameras may be stacked vertically or horizontally. If the viewing direction of the second camera is perpendicular to the viewing direction of the first camera, then only one displacement sensor at a single point (as opposed to a linear array of displacement sensors) would be needed to resolve the shaping relation. Using this single point as an initial condition, a profile along a line parallel to the viewing direction of the second camera can be recovered. This profile in combination with the analysis of the image acquired by the first camera can then be used to recover the shape of the rest of the specular reflective surface.

INDUSTRIAL APPLICABILITY

The apparatus and method described above can be applied to measurement of specular reflective surfaces. A practical application of the apparatus and method described above is in measurement of large-sized glass sheets useful in manufacture of flat panel displays. Measurements may be made using the apparatus and method described above under online conditions (i.e., while the glass sheet is being formed) or offline conditions (i.e., after forming the glass sheet). Offline measurements are illustrated in Examples 1 and 2 above.

Figure 10:
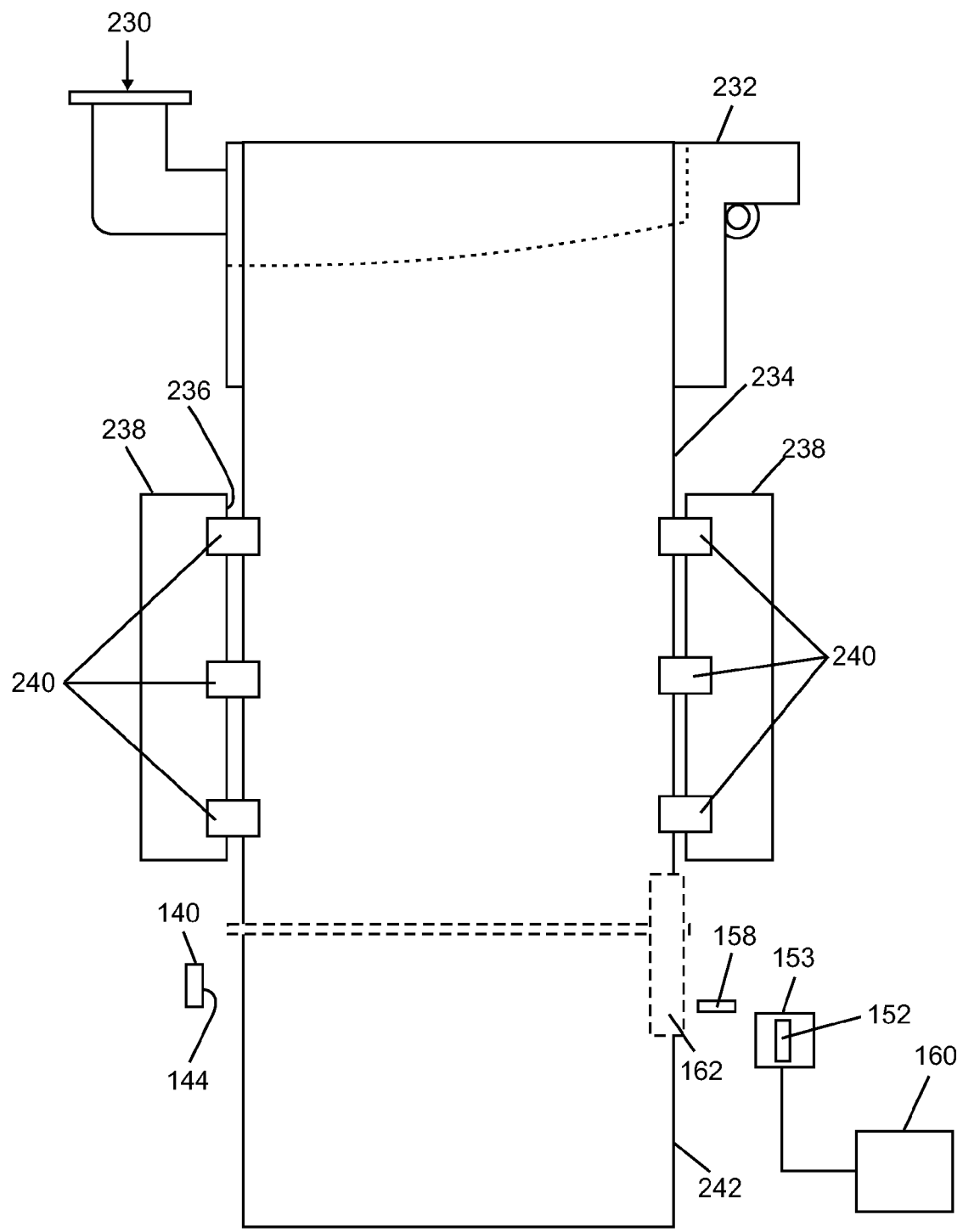
FIG. 10 depicts a glass sheet manufacturing process with online sheet shape measurement.

FIG. 10 illustrates a fusion draw process incorporating the apparatus and method described above under online conditions. In the example illustrated in FIG. 10, molten glass 230 flows into a fusion pipe 232 and overflows down the sides of the fusion pipe 232 to form a sheet-like flow 234, which is received in a channel 236. The channel 236 is defined by a pair of elongated guide members 238 arranged in parallel. The channel 236 may be vertical or may have other orientations, for example, horizontal or inclined. Rollers 240 arranged along the guide members 238 grip the side edges of the sheet-like flow 234 and draw the sheet-like flow 234 into a glass sheet 242. The fusion pipe 232, guide members 238, rollers 240, and channel 236 may be a part of a fusion draw machine. Target 140 having the pattern-bearing target surface 144, camera 153 having recording media 152, lens 158 for focusing functions, and linear array 162 of displacement sensors, as described above, may be provided at the bottom of the channel 236 to provide information about the shape of the glass sheet 242. Such information may be used in a no-bend separation, for example, or to optimize the fusion draw process, or for quality control.

What is claimed is:

1. A method of measuring a shape of a specular reflective surface, the method comprising:
    positioning a specular reflective surface to be measured at a measurement plane;
    positioning a target having a surface on which a pattern is displayed adjacent to and facing the specular reflective surface;
    positioning a recording device at an imaging plane adjacent to and facing the specular reflective surface to receive a reflection on the specular reflective surface of the pattern on the target;
    recording an image of the reflection at the imaging plane with the recording device;
    determining positions of a plurality of points on the specular reflective surface relative to the measurement plane;
    determining a first relation between feature positions on the image of the reflection and feature positions on the pattern; and
    determining the shape of the specular reflective surface from a second relation involving a surface profile of the specular reflective surface and the first relation using the positions of the plurality of points as an initial condition;
    wherein the second relation in one dimension has the form:

$$\frac{dz}{dx} = \frac{ux - t(u) + z}{\sqrt{1+u^2}\sqrt{(t(u)-z)^2 + x^2 + x + u(t(u)-z)}}$$

wherein z is the surface profile in a direction perpendicular to the measurement plane, dz/dx is the derivative of the surface profile, x is a direction parallel to the measurement plane, $\alpha$=ArcTan(u) is the angle between a vector in the direction of the reflected light and the measurement plane, t(u) is the first relation and $$u = \frac{z_p - z}{x_p - x};$$

where (xp,zp) is a location of a center of projection of the reflection onto the imaging plane.

2. The method of claim 1, further comprising illuminating the pattern on the surface of the target.

3. The method of claim 1, wherein the pattern displayed on the surface of the target is a planar geometric pattern.

4. The method of claim 1, further comprising focusing the image of the reflection on the imaging plane.

5. The method of claim 4, wherein focusing the image of the reflection on the imaging plane comprises using a lens to focus the image of the reflection onto the imaging plane.

6. The method of claim 1, wherein determining positions of the plurality of points on the specular reflective surface comprises measuring the positions of the points relative to the measurement plane.

7. The method of claim 6, wherein determining positions of the plurality of points on the specular reflective surface further comprises selecting the plurality of points along a line at or near an edge of the specular reflective surface.

8. The method of claim 7, wherein measuring the positions of the points comprises measuring with a linear array of displacement sensors disposed adjacent to the specular reflective surface.

9. The method of claim 8, wherein measuring the positions of the points comprises measuring without changing relative positions of the measurement plane, and the imaging plane.

10. The method of claim 1, wherein determining the first relation comprises identifying a plurality of sub-areas on the image of the reflection and a plurality of corresponding sub-areas on the pattern and determining a first sub-relation between feature positions on each of the sub-areas on the image of the reflection and feature positions on each of the corresponding sub-areas on the pattern.

11. The method of claim 10, wherein determining the shape of the specular reflective surface from the second relation comprises determining the shapes of sub-areas of the specular reflective surface from the second relation and the first sub-relations using the positions of the plurality of points as an initial condition.

12. The method of claim 11, further comprising combining the shapes of the sub-areas of the specular reflective surface to obtain the shape of the specular reflective surface.

13. A method of measuring a shape of a specular reflective surface, the method comprising:
    producing a reflection of a pattern displayed on a surface of a target from a specular reflective surface positioned at a measurement plane;
    recording an image of the reflection at an imaging plane with an imaging device;
    determining positions of a plurality of points on the specular reflective surface relative to the measurement plane;
    determining a first relation between feature positions on the image of the reflection and feature positions on the pattern; and
    determining the shape of the specular reflective surface from a second relation involving a surface profile of the specular reflective surface and the first relation using the positions of the plurality of points as an initial condition;
    wherein the second relation has the form:

$$I(t) = \frac{R - t - 2N(N \cdot (R-t))}{\sqrt{(R-t) \cdot (R-t)}};$$

wherein I(t) is the first relation, R is a point on the specular reflection surface, and N is a normal vector to the specular reflection surface;

$$N = \frac{\left\{-\frac{\partial z}{\partial x}, -\frac{\partial z}{\partial y}, 1\right\}}{\sqrt{1 + \left(\frac{\partial z}{\partial x}\right)^2 + \left(\frac{\partial z}{\partial y}\right)^2}};$$

wherein
    wherein z(x,y) is the surface profile and $$\frac{\partial z}{\partial x} \text{ and } \frac{\partial z}{\partial y}$$

are the partial derivatives of the surface profile.

14. An apparatus for measuring a shape of a specular reflective surface, comprising:
    a target having a surface on which a pattern is displayed;
    a camera having a recording media for recording an image of a reflection of the pattern produced from the specular reflective surface; and a data analyzer configured to determine the shape of the specular reflective surface from a first relation between feature positions on the image of the reflection and feature positions on the pattern and a second relation involving a surface profile of the specular reflective surface and the first relation;

wherein the data analyzer is configured to resolve the second relation having in one dimension the form:

$$\frac{dz}{dx} = \frac{ux - t(u) + z}{\sqrt{1+u^2}\sqrt{(t(u)-z)^2 + x^2} + x + u(t(u)-z)};$$

wherein z is the surface profile in a direction perpendicular to the measurement plane, dz/dx is the derivative of the surface profile, x is a direction parallel to the measurement plane, α=ArcTan(u) is the angle between a vector in the direction of the reflected light and the measurement plane, t(u) is the first relation, and $$u = \frac{z_p - z}{x_p - x};$$

wherein $(x_p, z_p)$ is a location of a center of projection of the reflection onto the recording media.

15. The apparatus of claim 14, further comprising a light source for illuminating the surface of the target.

16. The apparatus of claim 14, further comprising a linear array of displacement sensors for measuring positions of a plurality of points on the specular reflective surface relative to a reference plane.

17. The apparatus of claim 14, wherein the data analyzer is further configured to receive as input an initial condition comprising measured or known positions of a plurality of points on the specular reflective surface relative to a reference plane and to use the initial condition in determining the shape of the specular reflective surface.

18. An apparatus for measuring a shape of a specular reflective surface, comprising:

a target having a surface on which a pattern is displayed;

a camera having a recording media for recording an image of a reflection of the pattern produced from the specular reflective surface; and a data analyzer configured to determine the shape of the specular reflective surface from a first relation between feature positions on the image of the reflection and feature positions on the pattern and a second relation involving a surface profile of the specular reflective surface and the first relation;

wherein the data analyzer is configured to resolve the second relation having the form:

$$I(t) = \frac{R - t - 2N(N \cdot (R-t))}{\sqrt{(R-t) \cdot (R-t)}};$$

wherein t is first relation, R is a point on the specular reflection surface, and N is a normal vector to the specular reflection surface;

wherein $$N = \frac{\left\{-\frac{\partial z}{\partial x}, -\frac{\partial z}{\partial y}, 1\right\}}{\sqrt{1 + \left(\frac{\partial z}{\partial x}\right)^2 + \left(\frac{\partial z}{\partial y}\right)^2}};$$

wherein z is the surface profile and $$\frac{\partial z}{\partial x} \text{ and } \frac{\partial z}{\partial y}$$

are the partial derivatives of the surface profile.

* * * * *